US008245921B2

(12) United States Patent
Sol

(10) Patent No.: US 8,245,921 B2
(45) Date of Patent: Aug. 21, 2012

(54) ELECTRONIC TOLL SETTLEMENT SYSTEM AND APPARATUS FOR VEHICLE

(75) Inventor: Un Hwan Sol, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 243 days.

(21) Appl. No.: 12/535,020

(22) Filed: Aug. 4, 2009

(65) Prior Publication Data

US 2010/0032479 A1 Feb. 11, 2010

(30) Foreign Application Priority Data

Oct. 8, 2008 (KR) ........................ 10-2008-0098792

(51) Int. Cl.
*G06K 5/00* (2006.01)

(52) U.S. Cl. ........................................ 235/380; 235/383

(58) Field of Classification Search .................. 235/380, 235/383, 487, 492, 462.45, 472.02
See application file for complete search history.

(56) References Cited

U.S. PATENT DOCUMENTS

| | | | | |
|---|---|---|---|---|
| 6,791,475 | B2 * | 9/2004 | Yamashita | 340/935 |
| 7,552,094 | B2 * | 6/2009 | Park et al. | 705/65 |
| 2004/0230480 | A1 * | 11/2004 | Kanayama | 705/13 |

FOREIGN PATENT DOCUMENTS

| | | | |
|---|---|---|---|
| JP | 2007-065939 | A | 3/2007 |
| KR | 1020020050069 | A | 6/2002 |
| KR | 10-2004-0078730 | A | 9/2004 |
| KR | 10-2005-0118982 | A | 12/2005 |
| KR | 10-0561668 | | 3/2006 |
| KR | 10-2007-0103827 | A | 10/2007 |
| KR | 10-2008-001626 | | 2/2008 |
| KR | 10-2008-0020157 | A | 3/2008 |
| KR | 10-2008-0032589 | A | 4/2008 |

OTHER PUBLICATIONS

Derwent-Acc-No. 2008-F22981, Park et al, Method for automatically collecting toll using mobile communication unit and on-board unit applicable for the method capable of toll within wireless communication period between wireless communication system and the OBU.*

* cited by examiner

*Primary Examiner* — Daniel StCyr
(74) *Attorney, Agent, or Firm* — Edwards Wildman Palmer LLP; Peter F. Corless

(57) ABSTRACT

The present invention relates to an electronic toll settlement system and apparatus of a vehicle, more particularly, to a technology that settles a toll of a vehicle with a high-pass system through an identification card of a mobile communications terminal instead of a smart card in a high-pass terminal which is built in a mirror.

16 Claims, 3 Drawing Sheets

ELECTRONIC TOLL SETTLEMENT SYSTEM AND APPARATUS FOR VEHICLE

CROSS-REFERENCE TO RELATED APPLICATION

This application claims under 35 U.S.C. §119(a) the benefit of Korean Patent Application No. 10-2008-0098792 filed on Oct. 8, 2008, the entire contents of which are incorporated herein by reference.

BACKGROUND OF THE INVENTION

The present invention relates to an electronic toll settlement (collection) system and an apparatus of a vehicle which automatically settles a toll of a vehicle while wirelessly communicating with a tollgate settlement server.

Preferably, a high-pass terminal of a vehicle mounts a smart card in a vehicle in which an advance payable toll is charged up while wirelessly communicating with the tollgate settlement server in a tollgate that is installed at an expressway such that the toll of the vehicle is automatically settled.

According to preferred embodiments of the present invention, a high-pass terminal user may visit an expressway business office in order to charge up the smart card with the advance payable toll. The high-pass terminal user may purchase additional charge to suitably charge up the smart card with the advance payable toll.

Preferably, such a high-pass terminal is usually built in a mirror of a vehicle so that a user may attach and detach the smart card from the high-pass terminal which is built in the mirror to use.

But, the high-pass terminal may be physically damaged since a mirror of a vehicle is heated due to a direct ray of a light in summer. Particularly, there is a problem in that the smart card attached into the high-pass terminal is easily deformed and damaged due to the heat since the property of the smart card is plastic which is not durable in heat.

Moreover, the cost of buying a high-pass terminal and smart card is high. Therefore, it is necessary to develop a technology of settling a toll with a high-pass system in expressway without using the high-pass terminal and the smart card.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention provides an electronic toll settlement system and apparatus of a vehicle which suitably settles a toll through an identification card of a mobile communications terminal instead of a smart card of a high-pass terminal which is preferably built in a mirror.

According to a preferred embodiment of the present invention, an electronic toll settlement system of a vehicle preferably includes an electronic toll settlement device that delivers information of toll payable and information of a vehicle to a mobile communications terminal which has been already registered; the mobile communications terminal that pays the toll payable through an identification card and delivers a payment confirmation message for a paid toll to the electronic toll settlement device; and a tollgate settlement server that receives the payment confirmation message from the electronic toll settlement device and settles the paid toll.

In accordance with another preferred embodiment of the present invention, the electronic toll settlement device preferably includes a wireless communications means that suitably receives the information of the toll payable from the tollgate settlement server; and a wireless local communications module that suitably delivers the information of the toll payable and the information of the vehicle to the mobile communications terminal, and then suitably receives the payment confirmation message for the paid toll from the mobile communications terminal.

In accordance with another preferred embodiment of the present invention, the electronic toll settlement device further includes a suitable database in which the information of the mobile communications terminal of a toll settler of the vehicle is preferably registered; a key input unit that generates an user control signal; a controller that suitably searches information of the mobile communications terminal delivering the information of toll payable and vehicle in the database; and a display unit that suitably displays information of the toll payable.

In accordance with another further embodiment of the present invention, the mobile communications terminal preferably includes a wireless local communications module that suitably receives the information of toll payable and vehicle from the electronic toll settlement device of the vehicle; an identification card connection unit that preferably inputs and outputs data while being electrically connected to an identification card in which e-cash or deferred settlement information is stored; and a controller that suitably settles the toll payable by using e-cash or the deferred settlement information of the identification card, and then suitably generates a payment confirmation message when the payment is settled; wherein the wireless local communications module suitably delivers the payment confirmation message to the electronic toll settlement device.

In accordance with another further embodiment of the present invention, when the e-cash which is charged in the identification card is suitably less than the toll payable to fail in the settlement, the controller generates a settlement failure signal and then suitably delivers it to the electronic toll settlement device such that the electronic toll settlement device then suitably delivers the settlement failure signal to the tollgate settlement server, wherein the controller delivers the information of toll payable for the insufficient amount and the information of the vehicle to a toll payment server through a mobile communications module such that the toll payment server suitably processes payment of toll payable and then delivers the information of the paid toll and the information of the vehicle to the tollgate settlement server for settlement.

In accordance with another preferred embodiment of the present invention, the controller settles the toll payable by using deferred settlement information, and delivers the payment confirmation message through the wireless local communications module to the tollgate settlement server through the electronic tollgate settlement device, wherein the controller suitably delivers the settlement request message for the deferred settlement information to the toll payment server through the mobile communications module.

In accordance with another preferred embodiment of the present invention, the toll payment server preferably includes an authenticator that suitably authenticates the mobile communications terminal; a communications module that suitably delivers, in case of succeeding in an authenticator that authenticates the mobile communications terminal; a communications module that suitably delivers, in case of succeeding in an authentication of the mobile communications terminal, a settlement confirmation request message for the settlement request message of the information of the toll payable for the insufficient amount to the mobile communications terminal, and receives a settlement approval message generated in response to the settlement confirmation request message from the mobile communications terminal; and a settlement unit that pays the toll payable based on the settlement approval message, and suitably delivers the paid toll to the tollgate settlement server.

In accordance with another further embodiment of the present invention, the tollgate settlement server preferably includes a wireless communications means that suitably settles a toll of a vehicle in driving while wirelessly communicating with a wireless communications means of the electronic toll settlement device; a register that suitably registers a vehicle in which the electronic toll settlement device is installed as a violation vehicle in a database, in case a settlement failure signal is delivered from the electronic toll settlement device during a toll settlement; a data receiver that suitably receives the information of the paid toll and vehicle from the toll payment server; a deregistration unit that suitably cancels a violation vehicle registration of a vehicle on the database through the information of the paid toll and vehicle; and a data transmission unit that suitably delivers the result of the vehicle deregistration to the mobile communications terminal such that the mobile communications terminal delivers it to the electronic toll settlement device.

In accordance with another preferred embodiment of the present invention, the toll payment server preferably includes an authenticator that suitably authenticates the mobile communications terminal; a communications module that suitably delivers, in case of succeeding in an authentication of the mobile communications terminal, a settlement confirmation request message for the settlement request message according to the deferred settlement information, and then suitably receives a settlement approval message generated in response to the settlement confirmation request message from the mobile communications terminal; and a settlement unit that pays the toll payable based on the settlement approval message, and delivers the paid toll to the tollgate settlement server.

In accordance with still another preferred embodiment of the present invention, the tollgate settlement server preferably includes a wireless communications means that settles a toll of a vehicle in driving while wirelessly communicating with a wireless communications means of the electronic toll settlement device; a register that suitably registers a vehicle in which the electronic toll settlement device is installed as an un-settlement vehicle in a database, in case a payment confirmation message according to the deferred settlement information is delivered from the electronic toll payment device; a data receiver that suitably receives the information of the paid toll and vehicle from the toll payment server; a deregistration unit that suitably cancels the un-settlement vehicle registration of a vehicle on the database after receiving the information of the paid toll and vehicle from the toll payment server; and a data transmission unit that suitably delivers the result of the un-settlement vehicle deregistration to the mobile communications terminal such that the mobile communications terminal delivers it to the electronic toll settlement device.

According to another preferred embodiment of the present invention, an electronic toll settlement device of a vehicle preferably includes a wireless communications means that suitably receives information of a toll payable from a tollgate settlement server; and a wireless local communications module that suitably delivers the information of the toll payable and information of the vehicle to a mobile communications terminal such that the mobile communications terminal preferably settles the toll payable through an identification card of the mobile communications terminal, wherein the wireless communications means suitably receives a payment confirmation message for a paid toll from the mobile communications terminal and delivers it to the tollgate settlement server for settlement.

In accordance with another preferred embodiment of the present invention, the electronic toll settlement device further includes a database in which information of the mobile communications terminal of a toll settler of the vehicle is suitably registered; a key input unit that suitably generates an user control signal; a controller that suitably searches the information of the mobile communications terminal which would deliver the information of the toll payable and the information of the vehicle in database; and a display unit that displays the information of the toll payable.

In accordance with another preferred embodiment of the present invention, the controller receives a settlement failure signal which is suitably generated as an e-cash which is charged in the identification card is less than the toll payable to fail in the settlement, from the mobile communications terminal through a wireless local communications module, and then suitably delivers it to a tollgate settlement server to register the vehicle as a violation vehicle in the tollgate settlement server, such that the mobile communications terminal delivers the information of toll payable for the insufficient amount and the information of the vehicle to a toll payment server through a mobile communications module, and the toll payment server pays the toll payable and delivers the information of the paid toll and the information of the vehicle to the tollgate settlement server, so that the tollgate settlement server cancels the registration of the vehicle in violation.

In accordance with still another preferred embodiment of the present invention, the controller preferably delivers a payment confirmation message according to a deferred settlement information through a wireless local communications module from a mobile communications terminal to suitably register as an un-settlement vehicle in the tollgate settlement server, such that the mobile communications terminal suitably delivers the information of the toll payable according to a deferred settlement information and the information of the vehicle to a toll payment server through a mobile communications module, and the toll payment server pays the toll payable and suitably delivers the information of the paid toll and the information of the vehicle to the tollgate settlement server, so that the tollgate settlement server cancels the registration of the un-settlement vehicle.

Preferably, the electronic toll settlement device of a vehicle of the present invention settles a toll through an identification card of a mobile communications terminal which is interconnected through a wireless local communications module. Therefore, it has an effect of reducing the cost for preparing an additional smart card for an expressway toll settlement.

Further, according to other preferred embodiments, the electronic toll settlement device of a vehicle of the present invention is able to suitably utilize elements excepting a wireless communications means, such as, but not limited to, an audio system, and a navigation system, which are installed in the vehicle. Accordingly, it has an effect of reducing the cost for preparing an additional high-pass terminal.

Preferably, according to certain preferred embodiments, the electronic toll settlement device of a vehicle of the present invention provides for a convenient deferred settlement of a toll through a toll payment server, even though the balance of an identification card is smaller than a toll.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

In a first aspect, the present invention features an electronic toll settlement system of a vehicle, comprising an electronic toll settlement device; and a mobile communications terminal.

In one embodiment, the electronic toll settlement system of a vehicle further comprises a tollgate settlement server.

In another embodiment, the electronic toll settlement device delivers information of toll payable and information of a vehicle to a mobile communications terminal.

In still another embodiment, the electronic toll settlement device has been already registered.

In one embodiment, the mobile communications terminal pays the toll payable through an identification card and delivers a payment confirmation message for a paid toll to an electronic toll settlement device.

In another embodiment, the tollgate settlement server receives the payment confirmation message from the electronic toll settlement device and settles the paid toll.

In another aspect, the invention features an electronic toll settlement device of a vehicle, comprising a wireless communications means, and a wireless local communications module.

In one embodiment, the electronic toll settlement device of a vehicle further comprises a tollgate settlement server.

In another embodiment, the wireless communications means receives a payment confirmation message for a paid toll from a mobile communications terminal and delivers it to a tollgate settlement server for settlement.

In another embodiment, the wireless communications means receives information of a toll payable from a tollgate settlement server.

In still another embodiment, the wireless local communications module delivers the information of the toll payable and information of the vehicle to a mobile communications terminal such that the mobile communications terminal settles the toll payable through an identification card of the mobile communications terminal.

The invention also features motor vehicles comprising an electronic toll settlement system of a vehicle according to any one of the aspects described herein.

Figure 1:
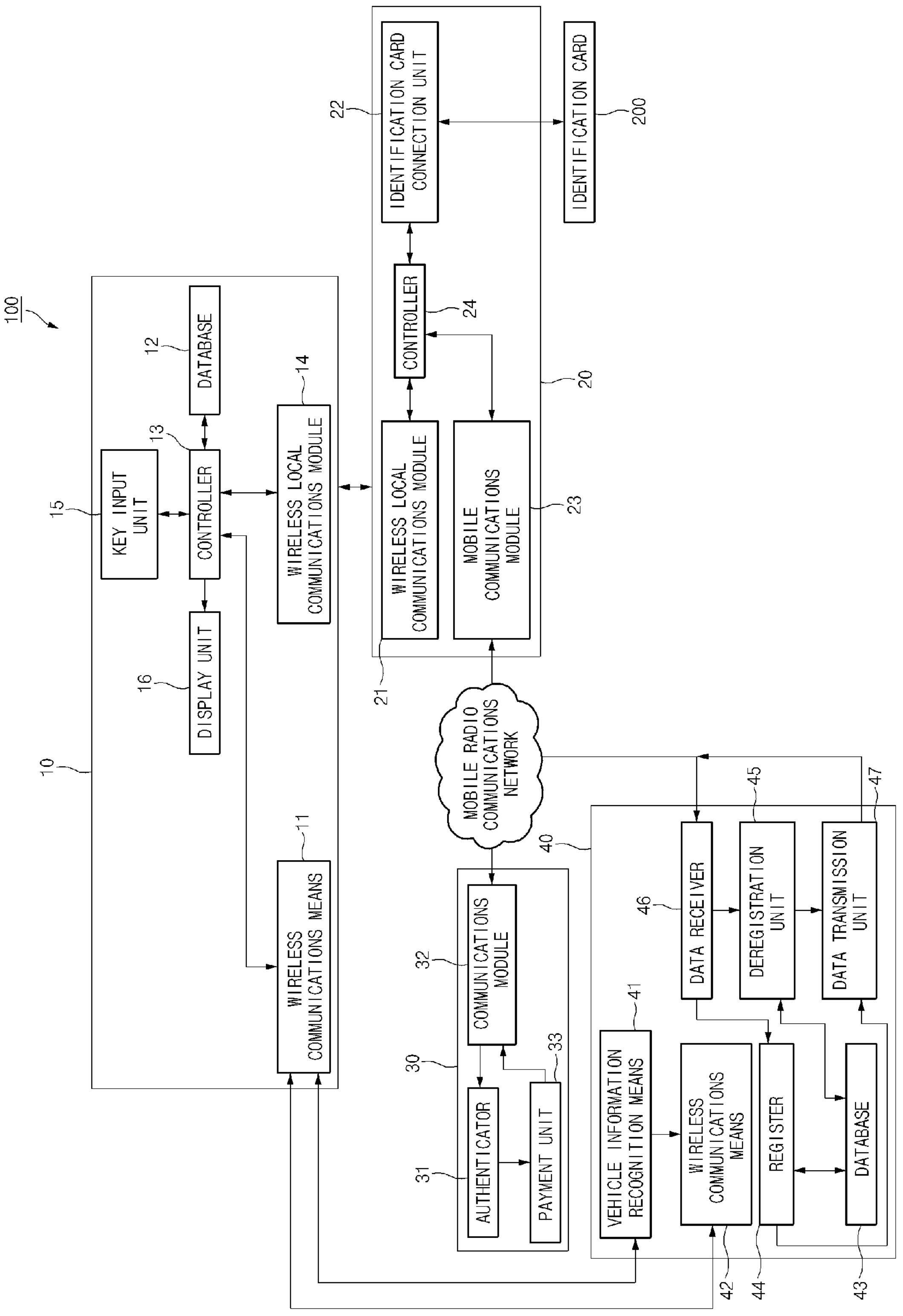
FIG. 1 is a block diagram of an exemplary electronic toll settlement system of a vehicle of the present invention.

Hereinafter, exemplary embodiments of the present invention will be described in detail with reference to the attached drawings According to certain preferred embodiments, for example as shown in FIG. 1, a block diagram of an electronic toll settlement system 100 of a vehicle of the present invention is shown.

Preferably, as shown in FIG. 1, the electronic toll settlement system 100 of a vehicle of the present invention includes, but is not limited to, an electronic toll settlement device 10, a mobile communications terminal 20, a toll payment server 30, a tollgate settlement server 40.

According to further preferred embodiments, the electronic toll settlement device 10 includes a wireless communications means 11, a database 12, a controller 13 a wireless local communications module 14, a key input unit 15 and a display unit 16.

Preferably, the database 12, the controller 13, the wireless local communications module 14, the key input unit 15 and the display unit 16 suitably utilize a component that preferably includes an audio, and further includes a navigation system which are suitably built in a dashboard of a vehicle. In further embodiments, the wireless communications means 11 is suitably built in a mirror.

In further preferred embodiments, the wireless communications means 11 suitably receives a settlement request signal of information of toll payable from a wireless communications means 42 of a tollgate settlement server 40, described herein, by using a RF (Radio Frequency) module or an IR (infrared) module. Preferably, if the payment confirmation message for the toll payable (paid toll) is suitably delivered from the mobile communications terminal 20 as described herein, the wireless communications means 11 suitably delivers this to the wireless communications means 42 of the tollgate settlement server 40.

Preferably, the information (MAC address or the like) of the mobile communications terminal 20 of a toll payer of a vehicle is already registered in the database 12.

According to further preferred embodiments of the present invention, the controller 13 searches the information of the mobile communications terminal 20 which then suitably delivers the information of the toll payable and the information (preferably, for example, the license plate numbers, vehicle owner personal information) of a vehicle in the database 12.

According then to further preferred embodiments, the wireless local communications module 14 is suitably comprised of a blue tooth module and then preferably delivers the information of the toll payable and the information (preferably, for example, the license plate numbers, vehicle owner personal information) of a vehicle to a wireless local communications module of the mobile communications terminal 20 which is then suitably searched in the database 12.

Preferably, the key input unit 15 generates a user control signal.

According to other further embodiments, in the meantime, the display unit 16 is preferably comprised of LCD or the like, and displays information of toll payable.

Preferably, the mobile communications terminal 20 suitably includes a wireless local communications module 21, an identification card connection unit 22, a mobile communications module 23 and a controller 24.

Preferably, the wireless local communications module 21 is comprised of a blue tooth module and suitably receives the information of the toll payable and vehicle from the wireless local communications module 14 of the electronic toll settlement device 10.

Preferably, the identification card connection unit 22 suitably inputs and outputs data while being electrically connected with the identification card.

According then to further preferred embodiments, here, the identification card refers to all cards which are suitably equipped with IC (integrated circuit) memory device to suitably contain high-capacity information and, preferably, is comprised of SIM (Subscriber Identity Module) card. Preferably, in the identification card, toll settlement information, and basic information including, but not limited only to, charged electronic money amount information, deferred settlement information, a card serial number, a date of issue, a digital signature are stored. Preferably, the deferred settlement information includes an account number of the identification card owner, a card number or a mobile communications terminal number.

In certain exemplary embodiments, the mobile communications module 23 suitably communicates data based on the communications module 32 of the toll payment server 30 and a mobile radio communications network.

In other further embodiments, the controller 24 suitably settles the toll payable by using e-cash or by the deferred settlement information of the identification card. Accordingly, in the case of succeeding in the settlement of the toll payable, the controller 24 suitably generates the payment confirmation message and delivers it to the tollgate settlement server 40 for settlement through the wireless communications module 32.

Preferably, when the controller 24 suitably settles the toll payable with the e-cash of the identification card, if the e-cash which is charged in the identification card is suitably less than the toll payable such that it fails in the settlement, a settlement failure signal is suitably delivered to the wireless local communications module 14 of the electronic toll settlement device 10 through the wireless local communications module 21. Accordingly, the electronic toll settlement device 10 suitably delivers the settlement failure signal to the tollgate settlement server 40 through the wireless communications means 11.

Accordingly, in further embodiments, the toll payable is suitably comprised of an insufficient amount or a whole toll amount. Preferably, when the toll payable is comprised of the insufficient amount, even if the money which is charged in the identification card is suitably smaller than the toll which is requested in the tollgate settlement server 40, the controller 24 firstly settles the toll with money that remains in the identification card and then generates a toll payable only with the rest of the insufficient amount.

In other embodiments of the invention, when the toll payable is preferably comprised of the amount of the toll, if the money which is suitably charged in the identification card is smaller than the toll which is requested in the tollgate settlement server 40, the controller 24 stops the settlement and generates a toll payable with a toll which is suitably requested in the tollgate settlement server 40.

In other embodiments, if the toll payable is paid by the deferred settlement information of the identification card, the controller 24 then suitably delivers the settlement request message for deferred settlement information to the toll payment server 30 through the mobile communications module 23. Accordingly, the toll payment server 30 pays the toll payable and a paid toll is suitably delivered to the tollgate settlement server 40 for settlement.

Preferably, the controller 24 suitably settles the toll payable of by using the deferred settlement information, which is meant to refer to the settlement being performed with a credit card settlement, an account transfer or a mobile phone micro settlement by suitably registering the toll payable in the card number of the identification card, the account number or the mobile communications terminal number.

In certain preferred embodiments of the present invention, the toll payment server 30 preferably includes, but is not only limited to, a communications module 32, an authenticator 31, a payment unit 33. Preferably, the toll payment server 30 is comprised of a mobile communications server or a banking facility server such as a bank. In related embodiments, the toll payment server 30 is suitably connected to the mobile communications terminal 20 based on the mobile radio communications network such that any server is available to use if the deferred settlement of the toll payable is possible.

In other preferred embodiments, the communications module 32 suitably receives the information of the toll payable for the insufficient amount or the settlement request message for the deferred settlement information, and the information of the vehicle and the terminal information of the mobile communications terminal 20 from the mobile communications module 23 of the mobile communications terminal 20, and then suitably delivers them to the authenticator 31.

Preferably, the authenticator 31 authenticates the terminal information of the mobile communications terminal 20, for example, the SIM information based on an additional member information database (not shown).

The communications module 32 preferably delivers the settlement confirmation request message to the mobile communications terminal 20 when suitably succeeding in the authentication of the SIM information of the mobile communications terminal 20. Further, the communications module 32 suitably receives the settlement approval message generated in response to the settlement confirmation request message from the mobile communications terminal 20.

In other preferred embodiments, the payment unit 33 suitably pays the toll payable based on the settlement approval message and then suitably delivers the information of paid toll and vehicle to a data receiver 46 of the tollgate settlement server 40 through the communications module 32. Preferably, the method of suitably settling a corresponding amount on an actual account in present time, or the method of attaching and delivering a digital receipt or a settlement identification corresponding to the toll payable can be used for the delivering of paid toll. In further embodiments, the payment unit 33 suitably delivers the information of the mobile communications terminal 20 while delivering the information of toll payable and vehicle to the tollgate settlement server 40 through the communications module 32. Accordingly, the tollgate settlement server 40 is preferably able to directly deliver the deregistration result to the mobile communications terminal 20 based on the information of the mobile communications terminal 20.

According to other preferred embodiments of the present invention, the tollgate settlement server 40 preferably includes a vehicle information recognition means 41, a wireless communications means 42, a register 44, a data receiver 46, a deregistration unit 45, a data transmission unit 47.

Preferably, after measuring the width, the height, and the length of a driving vehicle which entered within a radio wave reaching distance, and searching them in an additional vehicle information database (not shown), the vehicle information recognition means 41 confirms a vehicle model. Then, the vehicle information recognition means 41 suitably calculates the toll of a corresponding vehicle according to a vehicle model after the confirmation of a vehicle model.

Preferably, the wireless communications means 42 wirelessly communicates with the wireless communications means 13 of the electronic toll settlement device 10 installed in the vehicle which entered within the radio wave reaching distance, the vehicle model of which is determined by the vehicle information recognition means 41. Accordingly, the wireless communications means 42 suitably delivers the toll settlement request signal to the wireless communications means 11 of the electronic toll settlement device 10. Moreover, the wireless communications means 42 receives the payment confirmation message for the toll payable by e-cash or deferred settlement information or the settlement fail signal by e-cash from the wireless communications means 11 of the electronic toll settlement device 10.

Preferably, the register 44 suitably registers the vehicle in which the electronic toll settlement device 10 is installed as a violation vehicle in a database 43 in case of receiving the settlement fail signal from the electronic toll settlement device 10. In other related embodiments, the register 44 registers the vehicle in which the electronic toll settlement device 10 is installed as a un-settlement vehicle in the database 43 in examples when suitably receiving the payment confirmation message according to deferred settlement information from the electronic toll settlement device 10.

In preferred examples, the data receiver 46 suitably delivers the information of toll payable and vehicle delivered from the toll payment server 30 to the deregistration unit 45.

In other further examples, in the case of suitably receiving the information of paid toll and vehicle from the toll payment server 30, the deregistration unit 45 cancels the violation vehicle registration or the un-settlement vehicle registration of the vehicle on the database 43 through the information of vehicle.

Preferably, the data transmission unit delivers the violation vehicle deregistration result to the mobile communications terminal 20.

Hereinafter, the operation according to a first and a second embodiment of the electronic toll settlement system 100 of a vehicle of the present invention will be illustrated according to a preferred exemplary embodiment of the present invention.

A first embodiment displays an example of the operation in an exemplary case wherein an identification card of the present invention uses an advanced settlement method. A second embodiment displays an example of the operation in case an identification card of the present invention uses a deferred settlement method.

Figure 2:
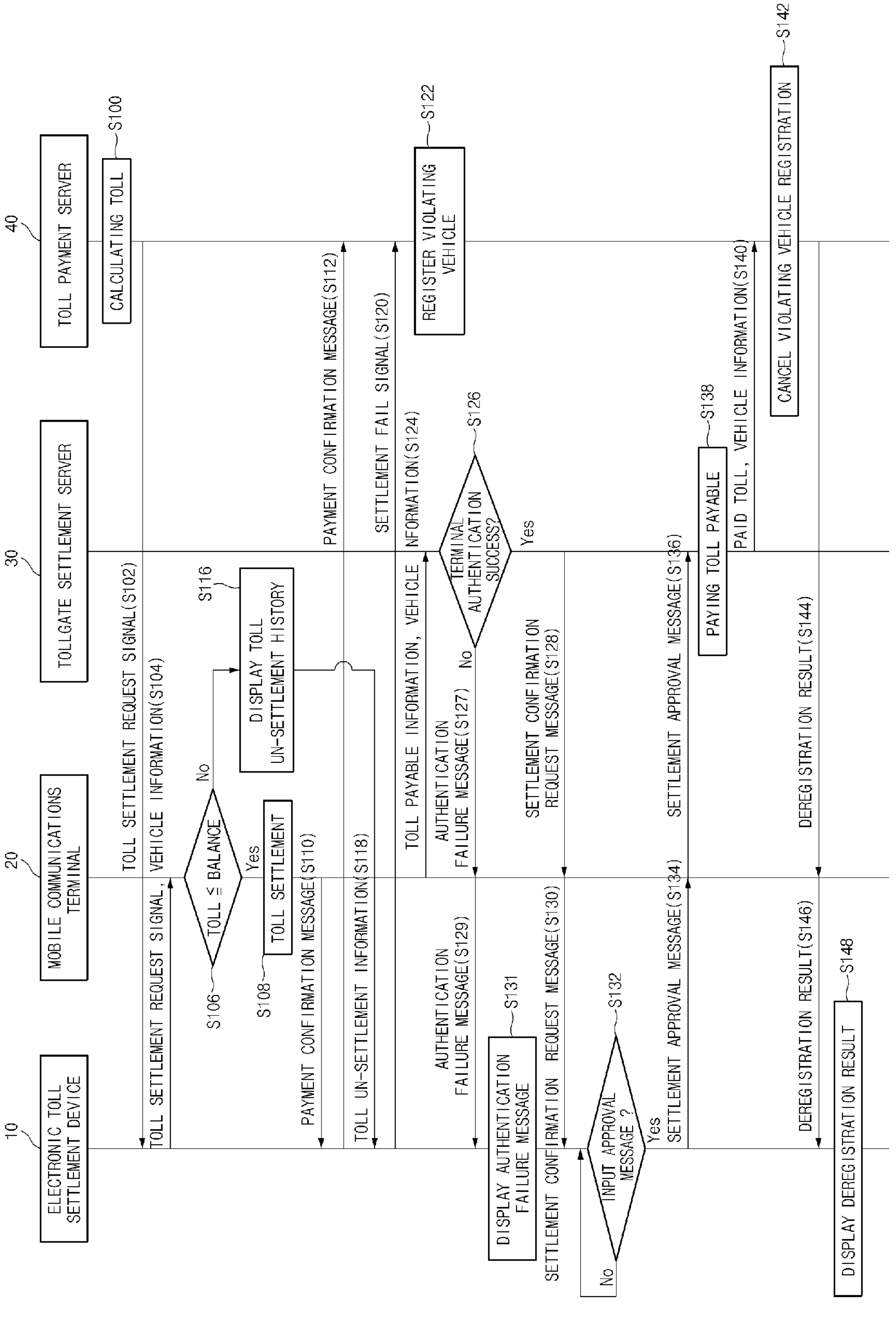
FIG. 2 is a flowchart showing an operation according to a first preferred embodiment of an electronic toll settlement system of a vehicle of the present invention.

FIG. 2 is a flowchart showing a preferred operation according to a first embodiment of an electronic toll settlement system 100 of a vehicle of the present invention.

According to certain preferred embodiments and as shown in FIG. 2, if a vehicle driving on expressway enters within a suitable radio wave reaching distance, the vehicle information recognition means 41 of the tollgate settlement server 40 measures the width, the length and the height of the vehicle, and then suitably calculates the toll of vehicle (S100).

Accordingly, the wireless communications means 42 of the tollgate settlement server 40 suitably delivers the toll settlement request signal for the toll to the wireless communications means 11 of the electronic toll settlement device 10 (S102).

Preferably, the controller 13 of the electronic toll settlement device 10 suitably adds the information of the vehicle to the toll settlement request signal through the wireless local communications module 14 and then suitably delivers them to the wireless local communications module 32 of the mobile communications terminal 20 which is already registered in the database 12 (S104).

Preferably, the controller 24 of the mobile communications terminal 20 suitably determines whether the toll is smaller than the balance which is charged in the identification card (S106).

In further preferred embodiments, the controller 24 of the mobile communications terminal 20 suitably settles the toll with an amount which is charged in the identification card when the toll is suitably smaller than the balance which is charged in the identification card (S108).

Preferably, the controller 24 of the mobile communications terminal 20 suitably delivers the payment confirmation message according to the toll settlement information through the wireless local communications module 21 to the wireless local communications module 14 of the electronic toll settlement device 10 if it succeeds in settlement of the toll (S110).

Preferably, the controller 13 of the electronic toll settlement device 10 then suitably delivers the payment confirmation message to the tollgate settlement server 40 through the wireless communications means 11 (S112), so that the toll payable is suitably settled (S114).

According then to other further preferred embodiments, at step S106, if the toll exceeds the balance which is charged in the identification card, the controller 24 of the mobile communications terminal 20 suitably displays the toll un-settlement information with a voice or a screen through the display unit 16 (S116).

Preferably, the controller 24 of the mobile communications terminal 20 suitably delivers the toll un-settlement information to the wireless local communications module 14 of the electronic toll settlement device 10 through the wireless local communications module 21 (S118).

preferably, the controller 13 of the electronic toll settlement device 10 suitably delivers the settlement fail signal according to the toll un-settlement information of the insufficient amount to the wireless communications means 42 of the tollgate settlement server 40 through the wireless communications means 11 (S120).

Accordingly, then, if the settlement fail signal according to the toll un-settlement information of the insufficient amount is suitably delivered from the electronic toll settlement device 10, the tollgate settlement server 40 suitably registers the vehicle in which the electronic toll settlement device 10 is installed in the database 43 as a violation vehicle (S122).

According to further embodiments, in the meantime, after step S118, the controller 24 of the mobile communications terminal 20 suitably delivers the information of toll payable for the insufficient amount and the information of the vehicle to the mobile communications module 23 of the toll payment server 30 through the mobile communications module 23 (S124).

Preferably, the authenticator 31 of the toll payment server 30 suitably authenticates the mobile communications terminal 20 based on an additional member information database (not shown) (S126).

Preferably, the authenticator 31 of the toll payment server 30 suitably generates an authentication failure message if it fails in the authentication of the mobile communications terminal 20, delivering it to the mobile communications terminal 20 (S127).

According to still other further embodiments, the mobile communications terminal 20 suitably delivers the authentication failure message to the electronic toll settlement device 10 (S129), while the electronic toll settlement device 10 suitably displays the authentication failure message to a user (S131).

Further, in other preferred embodiments, for example when authentication of the mobile communications terminal 20 at step S126 is a success, the communications module 32 of the toll payment server 30 suitably delivers the settlement confirmation request message to the mobile communications module 23 of the mobile communications terminal 20 (S128).

Preferably, the mobile communications terminal 20 suitably delivers the settlement confirmation request message to the electronic toll settlement device 10 (S130).

Further, the electronic toll settlement device 10 suitably displays the settlement confirmation request message through the display unit 16, and suitably determines whether the settlement approval message for the settlement confirmation request message is inputted through the key input unit 15 (S132).

Accordingly, if the settlement confirmation request message is suitably inputted through the key input unit 15, the electronic toll settlement device 10 delivers the settlement approval message to the mobile communications terminal 20 (S134).

Preferably, the mobile communications terminal 20 delivers the settlement approval message to the toll payment server 30 (S136).

Further, the toll payment server 30 preferably pays the toll payable based on the settlement approval message (S138), and suitably delivers the information of paid toll and vehicle to the data receiver of the tollgate settlement server 40 (S140).

Preferably, the deregistration unit 45 of the tollgate settlement server 40 suitably cancels the violation vehicle registration for a corresponding vehicle on the database 43 with reference to the information of the paid toll and vehicle delivered from the toll payment server 30 (S142).

In further preferred embodiments, the data transmission unit 47 of the tollgate settlement server 40 suitably delivers the deregistration result of the vehicle to the mobile communications terminal 20 (S144), while the mobile communications terminal 20 suitably delivers the deregistration result of the vehicle to the electronic toll settlement device 10 (S146).

Preferably, the electronic toll settlement device 10 displays the deregistration result of the vehicle to a user through the display unit 16 (S148).

Figure 3:
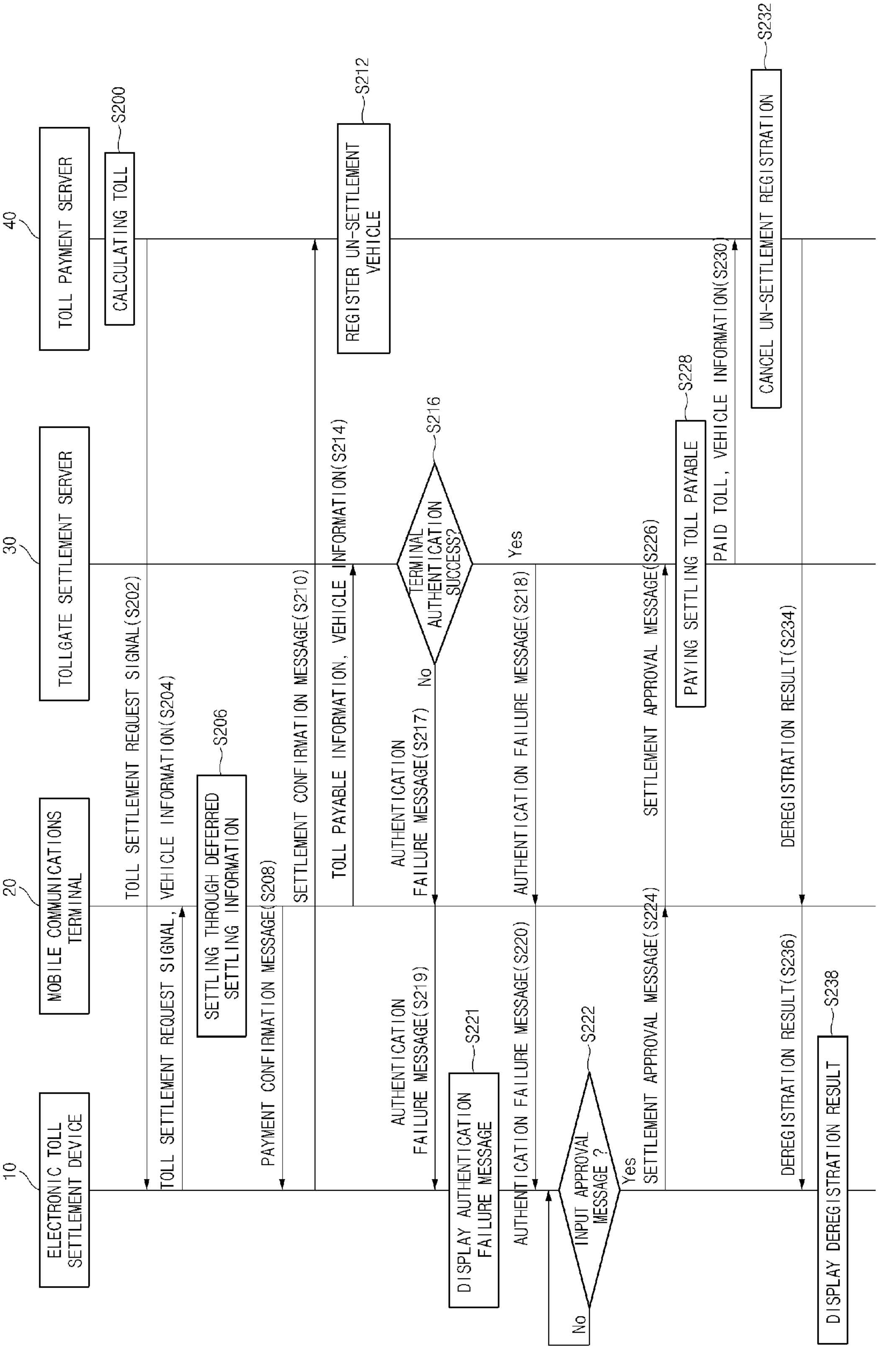
FIG. 3 is a flowchart showing operation according to a second preferred embodiment of an electronic toll settlement system of a vehicle of the present invention.

In another preferred embodiment of the invention, for example as shown in FIG. 3, a flowchart shows the operation according to a second embodiment of an electronic toll settlement system 100 of a vehicle.

For example, and as shown in FIG. 3, if a vehicle driving on expressway enters into within a radio wave reaching distance, the vehicle information recognition means 41 of the tollgate settlement server 40 preferably measures the width, the length and the height of the vehicle, and suitably calculates the toll of vehicle (S200).

Preferably, the wireless communications means 42 of the tollgate settlement server 40 suitably delivers the toll settlement request signal for the toll to the wireless communications means 11 of the electronic toll settlement device 10 (S202).

According to preferred embodiment of the present invention, the controller 13 of the electronic toll settlement device 10 adds the toll settlement request signal and the information of the vehicle through the wireless local communications module 14 and then suitably delivers them to the wireless local communications module 32 of the mobile communications terminal 20 which is already registered in the database 12 (S204).

Accordingly, if the identification card is preferably a deferred settlement card, the controller 24 of the mobile communications terminal 20 pays the toll payable by using deferred settlement information (S206), suitably delivering the payment confirmation message to the electronic toll settlement device 10 through the wireless local communications module 21 (S208).

Preferably, the paying of the toll payable does not mean that the toll payable is paid in real, but it means that a payment confirmation message is suitably generated by regarding deferred settlement information as a payment.

Preferably, in exemplary embodiments, the electronic toll settlement device 10 suitably delivers the payment confirmation message according to the deferred settlement information to the wireless communications means 42 of the tollgate settlement server 40 through the wireless communications means 11 (S210).

Accordingly, if the payment confirmation message according to the deferred settlement information is suitably delivered from the electronic toll settlement device 10, the tollgate settlement server 40 suitably registers the vehicle in which the electronic toll settlement device 10 is installed as an unsettlement vehicle in the database 43 (S212).

Preferably, the controller 24 of the mobile communications terminal 20 suitably delivers the settlement request message for the deferred settlement information including the information of toll payable and vehicle to the communications module 32 of the toll payment server 30 through the mobile communications module 23 (S214).

Preferably, the authenticator 31 of the toll payment server 30 suitably authenticates the mobile communications terminal 20 based on an additional member information database (not shown) (S216).

In certain exemplary embodiments, for example in case of failing in the authentication of the mobile communications terminal 20, the authenticator 31 of the toll payment server 30 suitably generates an authentication failure message, delivering it to the mobile communications terminal 20 (S217).

Preferably, the mobile communications terminal 20 suitably delivers the authentication failure message to the electronic toll settlement device 10 (S219), while the electronic toll settlement device 10 and suitably displays the authentication failure message to a user (S221).

In further preferred embodiments, in examples of succeeding in the authentication of the mobile communications terminal 20 at step S216, the communications module 32 of the toll payment server 30 suitably delivers the settlement confirmation request message to the mobile communications module 23 of the mobile communications terminal 20 (S218).

Preferably, the mobile communications terminal 20 suitably delivers the settlement confirmation request message to the electronic toll settlement device 10 (S220).

Preferably, the electronic toll settlement device 10 suitably displays the settlement confirmation request message through the display unit 16, and then suitably determines whether the settlement approval message for the settlement confirmation request message is inputted through the key input unit 15 (S222).

Accordingly, if the settlement approval message for the settlement confirmation request message is suitably inputted through the key input unit 15, the electronic toll settlement device 10 delivers the settlement approval message to the mobile communications terminal 20 (S224).

Preferably, the mobile communications terminal 20 delivers the settlement approval message to the toll payment server 30 (S226).

Further, the toll payment server 30 suitably pays the toll payable based on the settlement approval message (S228), and then preferably delivers the information of paid toll and vehicle to the data receiver of the tollgate settlement server 40 (S230).

According to other preferred embodiments, the deregistration unit 45 of the tollgate settlement server 40 suitably cancels the un-settlement registration for a corresponding vehicle on the database 43 with reference to the information of the toll payable and vehicle delivered from the toll payment server 30 (S232).

According to other preferred embodiments, the data transmission unit 47 of the tollgate settlement server 40 suitably delivers the deregistration result of the vehicle to the mobile communications terminal 20 (S234), while the mobile communications terminal 20 suitably delivers the deregistration result of the vehicle to the electronic toll settlement device 10 (S236).

Preferably, the electronic toll settlement device 10 displays the deregistration result of the vehicle to a user through the display unit 16 (S238).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electronic toll settlement system of a vehicle, comprising:

an electronic toll settlement device that delivers information associated with a toll payable and information associated with a vehicle, which has been already registered, to a mobile communications terminal;

a mobile communications terminal that pays the toll payable through an identification card and delivers a payment confirmation message for a paid toll to the electronic toll settlement device; and a tollgate settlement server that delivers information associated with a toll payable to the electronic toll settlement device, and receives the payment confirmation message from the electronic toll settlement device and settles the paid toll, the mobile communications terminal communicating with a toll payment server to pay the toll payable when the toll payable through the identification card fails.

2. The electronic toll settlement system of claim 1, wherein the electronic toll settlement device comprises:

a wireless communications means that receives the information of the toll payable from the tollgate settlement server; and a wireless local communications module that delivers the information of the toll payable and the information of the vehicle to the mobile communications terminal, and receives the payment confirmation message for the paid toll from the mobile communications terminal.

3. The electronic toll settlement system of claim 2, wherein the electronic toll settlement device further comprises:

a database in which the information of the mobile communications terminal of a toll settler of the vehicle is registered;

a key input unit that generates an user control signal;

a controller that searches information of the mobile communications terminal delivering the information of toll payable and vehicle in the database; and a display unit that displays information of the toll payable.

4. The electronic toll settlement system of claim 1, wherein the mobile communications terminal comprises:

a wireless local communications module that receives the information of toll payable and vehicle from the electronic toll settlement device of the vehicle;

an identification card connection unit that inputs and outputs data while being electrically connected to an identification card in which e-cash or deferred settlement information is stored; and a controller that settles the toll payable by using e-cash or the deferred settlement information of the identification card, and generates a payment confirmation message in case of succeeding in the settlement;

wherein the wireless local communications module delivers the payment confirmation message to the electronic toll settlement device.

5. The electronic toll settlement system of claim 4, wherein, when the e-cash which is charged in the identification card is less than the toll payable to fail in the settlement, the controller generates a settlement failure signal and delivers it to the electronic toll settlement device such that the electronic toll settlement device delivers the settlement failure signal to the tollgate settlement server, wherein the controller delivers the information of toll payable for the insufficient amount and the information of the vehicle to the toll payment server through a mobile communications module such that the toll payment server processes payment of toll payable and delivers the information of the paid toll and the information of the vehicle to the tollgate settlement server for settlement.

6. The electronic toll settlement system of claim 5, wherein the toll payment server comprises:

an authenticator that authenticates the mobile communications terminal;

a communications module that delivers, in case of succeeding in an authentication of the mobile communications terminal, a settlement confirmation request message for the settlement request message of the information of the toll payable for the insufficient amount to the mobile communications terminal, and receives a settlement approval message generated in response to the settlement confirmation request message from the mobile communications terminal; and a settlement unit that pays the toll payable based on the settlement approval message, and delivers the paid toll to the tollgate settlement server.

7. The electronic toll settlement system of claim 6, wherein the tollgate settlement server comprises:

a wireless communications means that settles a toll of a vehicle in driving while wirelessly communicating with a wireless communications means of the electronic toll settlement device;

a register that registers a vehicle in which the electronic toll settlement device is installed as a violation vehicle in a database, in case a settlement failure signal is delivered from the electronic toll settlement device during a toll settlement;

a data receiver that receives the information of the paid toll and vehicle from the toll payment server;

a deregistration unit that cancels a violation vehicle registration of a vehicle on the database through the information of the paid toll and vehicle; and a data transmission unit that delivers the result of the vehicle deregistration to the mobile communications terminal such that the mobile communications terminal delivers it to the electronic toll settlement device.

8. The electronic toll settlement system of claim 4, wherein the controller settles the toll payable by using deferred settlement information, and delivers the payment confirmation message through the wireless local communications module to the tollgate settlement server through the electronic tollgate settlement device, wherein the controller delivers the settlement request message for the deferred settlement information to the toll payment server through the mobile communications module.

9. The electronic toll settlement system of claim 8, wherein the toll payment server comprises:

an authenticator that authenticates the mobile communications terminal;

a communications module that delivers, in case of succeeding in an authentication of the mobile communications terminal, a settlement confirmation request message for the settlement request message according to the deferred settlement information, and receives a settlement approval message generated in response to the settlement confirmation request message from the mobile communications terminal; and a settlement unit that pays the toll payable based on the settlement approval message, and delivers the paid toll to the tollgate settlement server.

10. The electronic toll settlement system of claim 9, wherein the tollgate settlement server comprises:

a wireless communications means that settles a toll of a vehicle in driving while wirelessly communicating with a wireless communications means of the electronic toll settlement device;

a register that registers a vehicle in which the electronic toll settlement device is installed as an un-settlement vehicle in a database, in case payment confirmation message according to the deferred settlement information is delivered from the electronic toll payment device;

a data receiver that receives the information of the paid toll and vehicle from the toll payment server;

a deregistration unit that cancels the un-settlement vehicle registration of a vehicle on the database after receiving the information of the paid toll and vehicle from the toll payment server; and a data transmission unit that delivers the result of the un-settlement vehicle deregistration to the mobile communications terminal such that the mobile communications terminal delivers it to the electronic toll settlement device.

11. An electronic toll settlement device of a vehicle, comprising:

a wireless communications means that receives information of a toll payable from a tollgate settlement server and delivers a payment confirmation message for a paid toll from a mobile communication terminal to the tollgate settlement server; and a wireless local communications module that delivers the information of the toll payable and information of the vehicle to the mobile communications terminal such that the mobile communications terminal settles the toll payable through an identification card of the mobile communications terminal, the mobile communication terminal communicating with a toll payment server to pay the toll payable when payment of the toll payable through the identification card fails.

12. The electronic toll settlement device of claim 11, further comprising:

a database in which information of the mobile communications terminal of a toll settler of the vehicle is registered;

a key input unit that generates an user control signal;

a controller that searches the information of the mobile communications terminal which would deliver the information of the toll payable and the information of the vehicle in database; and a display unit that displays the information of the toll payable.

13. The electronic toll settlement device of claim 12, wherein the controller receives a settlement failure signal which is generated as an e-cash which is charged in the identification card is less than the toll payable to fail in the settlement, from the mobile communications terminal through a wireless local communications module, and delivers it to a tollgate settlement server to register the vehicle as a violation vehicle in the tollgate settlement server, such that the mobile communications terminal delivers the information of toll payable for the insufficient amount and the information of the vehicle to the toll payment server through a mobile communications module, and the toll payment server pays the toll payable and delivers the information of the paid toll and the information of the vehicle to the tollgate settlement server, so that the tollgate settlement server cancels the registration of the violation vehicle.

14. The electronic toll settlement device of claim 12, wherein the controller delivers a payment confirmation message according to a deferred settlement information through a wireless local communications module from a mobile communications terminal to register as an un-settlement vehicle in the tollgate settlement server, such that the mobile communications terminal delivers the information of the toll payable according to a deferred settlement information and the information of the vehicle to a toll payment server through a mobile communications module, and the toll payment server pays the toll payable and delivers the information of the paid toll and the information of the vehicle to the tollgate settlement server, so that the tollgate settlement server cancels the registration of the un-settlement vehicle.

15. An electronic toll settlement device of a vehicle, comprising:

a wireless communications means that receives information of a toll payable from a tollgate settlement server and delivers a payment confirmation message for a paid toll from a mobile communication terminal to the tollgate settlement server; and a wireless local communications module that delivers the information of the toll payable and information of the vehicle to the mobile communications terminal such that the mobile communications terminal settles the toll payable through an identification card of the mobile communications terminal, the mobile communication terminal communicating with a toll payment server to pay the toll payable when payment of the toll payable through the identification card fails.

wherein the electronic toll settlement device is integrated into a system installed in the vehicle.

16. A motor vehicle comprising:

an electronic toll settlement system including, a wireless communications means that receives information of a toll payable from a tollgate settlement server and delivers a payment confirmation message for a paid toll from a mobile communication terminal to the tollgate settlement server; and a wireless local communications module that delivers the information of the toll payable and information of the vehicle to the mobile communications terminal such that the mobile communications terminal settles the toll payable through an identification card of the mobile communications terminal, the mobile communication terminal communicating with a toll payment server to pay the toll payable when payment of the toll payable through the identification card fails.

* * * * *